(12) United States Patent
Gu et al.

(10) Patent No.: US 11,400,862 B2
(45) Date of Patent: Aug. 2, 2022

(54) VISION-BASED INTERACTIVE CONTROL APPARATUS AND METHOD OF CONTROLLING REAR-VIEW MIRROR FOR VEHICLE

(71) Applicant: BOE TECHNOLOGY GROUP CO., LTD., Beijing (CN)

(72) Inventors: Yu Gu, Beijing (CN); Ying Zhang, Beijing (CN); Yifei Zhang, Beijing (CN); Kai Zhao, Beijing (CN); Hongli Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1080 days.

(21) Appl. No.: 16/063,905

(22) PCT Filed: Jun. 16, 2017

(86) PCT No.: PCT/CN2017/088745
§ 371 (c)(1),
(2) Date: Jun. 19, 2018

(87) PCT Pub. No.: WO2018/227597
PCT Pub. Date: Dec. 20, 2018

(65) Prior Publication Data
US 2021/0197724 A1 Jul. 1, 2021

(51) Int. Cl.
B60R 1/072 (2006.01)
B60R 1/08 (2006.01)
(Continued)

(52) U.S. Cl.
CPC .............. *B60R 1/072* (2013.01); *B60R 1/087* (2013.01); *B60R 1/12* (2013.01); *G06F 3/013* (2013.01);
(Continued)

(58) Field of Classification Search
CPC ........... B60R 1/072; B60R 1/087; B60R 1/12; B60R 2001/1215; B60R 1/07;
(Continued)

(56) References Cited

U.S. PATENT DOCUMENTS 8,885,882 B1* 11/2014 Yin ........................... G06T 7/73
382/103
2004/0218277 A1* 11/2004 Bechtel ................... B60R 1/088
359/604
(Continued)

FOREIGN PATENT DOCUMENTS

| CA | 105073499 A | 11/2015 |
|---|---|---|
| CN | 102285340 A | 12/2011 |

(Continued)

OTHER PUBLICATIONS

First Office Action in the Chinese Patent Application No. 201780000443. 2, dated Jun. 28, 2021; English translation attached.
(Continued)

*Primary Examiner* — James M Pontius
(74) *Attorney, Agent, or Firm* — Intellectual Valley Law, P.C.

(57) ABSTRACT

The present application discloses a method of controlling a rear-view mirror for a vehicle. The method includes determining a gaze position and a gaze direction of a user; and controlling the rear-view mirror based on the user's gaze position and gaze direction.

19 Claims, 7 Drawing Sheets

(51) Int. Cl.
  *B60R 1/12* (2006.01)
  *G06F 3/01* (2006.01)
  *G06V 10/60* (2022.01)
  *G06V 20/59* (2022.01)
  *G06V 40/16* (2022.01)
  *G06V 40/18* (2022.01)

(52) U.S. Cl.
  CPC ............ *G06V 10/60* (2022.01); *G06V 20/597* (2022.01); *G06V 40/171* (2022.01); *G06V 40/193* (2022.01); *B60R 2001/1215* (2013.01)

(58) Field of Classification Search
  CPC .. G06F 3/013; G06K 9/00281; G06K 9/0061; G06K 9/00845; G06K 9/4661
  See application file for complete search history.

(56) References Cited

U.S. PATENT DOCUMENTS

| | | | |
|---|---|---|---|
| 2010/0026035 A1* | 2/2010 | Kikuchi | ............... B60J 3/04 296/97.7 |
| 2011/0266419 A1 | 11/2011 | Jones et al. | |
| 2014/0348389 A1* | 11/2014 | Graumann | ........... G06V 20/597 382/104 |
| 2015/0116197 A1 | 4/2015 | Hamelink | |
| 2016/0288717 A1 | 10/2016 | Kameshima et al. | |
| 2017/0046578 A1 | 2/2017 | Phillips | |
| 2017/0285741 A1* | 10/2017 | Park | ................... G06K 9/00617 |

FOREIGN PATENT DOCUMENTS

| | | |
|---|---|---|
| CN | 102320269 A | 1/2012 |
| CN | 104156069 A | 11/2014 |
| CN | 105083134 A | 11/2015 |
| CN | 105301774 A | 2/2016 |
| CN | 105323539 A | 2/2016 |
| CN | 105917401 A | 8/2016 |
| CN | 106347223 A | 1/2017 |
| CN | 106454310 A | 2/2017 |
| CN | 206067625 U | 4/2017 |
| CN | 106740493 A | 5/2017 |
| CN | 106740581 A | 5/2017 |
| CN | 106828326 A | 6/2017 |
| JP | 2008081071 A | 4/2008 |
| JP | 4893204 B2 | 3/2012 |

OTHER PUBLICATIONS

International Search Report & Written Opinion dated Mar. 15, 2018, regarding PCT/CN2017/088745.

\* cited by examiner

VISION-BASED INTERACTIVE CONTROL APPARATUS AND METHOD OF CONTROLLING REAR-VIEW MIRROR FOR VEHICLE

CROSS-REFERENCE TO RELATED APPLICATION

This application is a national stage application under 35 U.S.C. § 371 of International Application No. PCT/CN2017/088745, filed Jun. 16, 2017, the contents of which are incorporated by reference in the entirety.

TECHNICAL FIELD

The present invention relates to vehicular smart apparatuses, more particularly, to a vision-based interactive control apparatus and a method of controlling a rear-view mirror for a vehicle.

BACKGROUND

A rear-view mirror is a mirror mounted in a vehicle that allows the driver to see rearward through the vehicle's rear window. Typically, the rear-view mirror is attached to the top of the windshield. The rear-view mirror is typically mounted in a way so that its height and viewing angle are adjustable.

SUMMARY

In one aspect, the present invention provides a method of controlling a rear-view mirror for a vehicle, comprising determining a gaze position and a gaze direction of a user; and controlling the rear-view mirror based on the user's gaze position and gaze direction.

Optionally, the method further comprises illuminating the user's eye using a plurality of light sources, capturing a plurality of images of the user's face; identifying an eye region containing the user's eye in one of the plurality of images; detecting the plurality of glints in the eye region; calculating a center of a pupil of the user; and determining a relative positional relationship between the center of the pupil of the user and the plurality of glints respectively from the plurality of light sources in each of the plurality of images of the user's face; thereby determining a plurality of relative positional relationships between the center of the pupil of the user and the plurality of glints, respectively from a plurality of eye regions in the plurality of images of the user's face.

Optionally, determining the user's gaze position and gaze direction are performed based on the plurality of relative positional relationships between the center of a pupil of the user and the plurality of glints.

Optionally, controlling the rear-view mirror based on the user's gaze position and gaze direction comprises controlling image display in an image display area of the rear-view mirror based on the user's gaze position and gaze direction and the method further comprises evaluating whether the user is looking at the image display area of the rear-view mirror based on the user's gaze position and gaze direction.

Optionally, controlling image display in the image display area of the rear-view mirror comprises controlling the image display in the image display area of the rear-view mirror in a dimming mode in response to an evaluation indicating that the user is not looking at the image display area, and controlling the image display in the image display area of the rear-view mirror in a normal mode in response to an evaluation indicating that the user is looking at the image display area; and a brightness level of the image display in the dimming mode is lower than that in the normal mode.

Optionally, one or more selectable objects are displayed in the image display area of the rear-view mirror; the method further comprises evaluating whether a gaze position is within a threshold distance from a selectable object for a duration greater than a threshold duration; and selecting the selectable object out of the one or more selectable objects displayed in the image display area in response to a gaze status indicating that the gaze position is within the threshold distance from the selectable object for the duration greater than the threshold duration.

Optionally, the method further comprises controlling the rear-view mirror in an anti-glare mode in response to one or more glare conditions being detected, a reflectivity of the rear-view mirror in the anti-glare mode being dimmed.

Optionally, the rear-view mirror has a first side and a second side opposite to the first side, the second side being a light reflective side of the rear-view mirror; the method further comprises detecting a first light intensity received from the first side and detecting a second light intensity received from the second side; and controlling the rear-view mirror in the anti-glare mode in response to a difference between the first light intensity and the second light intensity being equal to or greater than a threshold value.

Optionally, the method further comprises evaluating whether a transition from a presence of a gaze position in the rear-view mirror to an absence of the gaze position in the rear-view mirror has occurred in a threshold period of time; and controlling the rear-view mirror in the anti-glare mode in response to the difference between the first light intensity and the second light intensity being equal to or greater than the threshold value, and an evaluation that the transition has occurred.

Optionally, the method further comprises evaluating whether a transition from a presence of a gaze position in the rear-view mirror to an absence of the gaze position in the rear-view mirror has occurred in a threshold period of time; wherein a difference between the first light intensity and the second light intensity is a detected value less than the threshold value at a time the transition has occurred; and the method further comprising updating the threshold value with the detected value.

Optionally, the method further comprises controlling the rear-view mirror in a first anti-glare mode having a first anti-glare parameter in response to the second light intensity being greater than the first light intensity by an intensity value in a first range; evaluating whether a transition from a presence of a gaze position in the rear-view mirror to an absence of the gaze position in the rear-view mirror occurs in a threshold period of time when the second light intensity is greater than the first light intensity by the intensity value in the first range; and controlling the rear-view mirror in a second anti-glare mode having a second anti-glare parameter different from the first anti-glare parameter in response to an evaluation that the transition has occurred when the second light intensity is greater than the first light intensity by the intensity value in the first range.

Optionally, the method further comprises turning off the anti-glare mode in response to a difference between the first light intensity and the second light intensity being smaller than the threshold value.

Optionally, the method further comprises calibrating the user's gaze position and gaze direction and the plurality of relative positional relationships between the center of a pupil of the user and the plurality of glints.

Optionally, the method further comprises adjusting a light emission intensity of the one of the plurality of light sources in response to a grayscale of one of the plurality of glints corresponding to the one of the plurality of light source being lower than a threshold grayscale.

In another aspect, the present invention provides a vision-based interactive control apparatus comprising an image processor configured to determine a gaze position and gaze direction of a user; a rear-view mirror; and a controller coupled to the rear-view mirror and the image processor, and configured to control the rear-view mirror based on the user's gaze position and gaze direction.

Optionally, the vision-based interactive control apparatus further comprises a plurality of image sensors configured to capture a plurality of images of a user's face; and a plurality of light sources configured to illuminate the user's eye; wherein the image processor is coupled to the plurality of image sensors and configured to determine the user's gaze position and gaze direction based on a relative positional relationship between a center of a pupil of the user and a plurality of glints respectively from the plurality of light sources in each of the plurality of images of the user's face.

Optionally, the image processor comprises a plurality of image feature analyzers corresponding to the plurality of image sensors, each of the plurality of image feature analyzers is configured to identify an eye region containing the user's eye in one of the plurality of images; detect the plurality of glints in the eye region; calculate a center of the pupil of the user; and determine the relative positional relationship between the center of the pupil of the user and the plurality of glints; wherein the plurality of image feature analyzers determine a plurality of relative positional relationships between the center of the pupil of the user and the plurality of glints, respectively from a plurality of eye regions in the plurality of images of the user's face.

Optionally, the rear-view mirror comprises an image display panel in an image display area; the controller is configured to control image display in the rear-view mirror based on the user's gaze position and gaze direction; and the image processor further comprises a gaze detector configured to calculate the user's gaze position and gaze direction based on the plurality of relative positional relationships between the center of a pupil of the user and the plurality of glints.

Optionally, the image processor further comprises a gaze status evaluator configured to evaluate whether the user is looking at the image display area of the rear-view mirror based on the user's gaze position and gaze direction.

Optionally, the controller is configured to control the image display in the rear-view mirror in a dimming mode in response to a gaze status indicating that the user is not looking at the image display area, and control the image display in the rear-view mirror in a normal mode in response to a gaze status indicating that the user is looking at the image display area; and a brightness level of the image display in the dimming mode is lower than that in the normal mode.

Optionally, one or more selectable objects are displayed in the image display area of the image display panel; the gaze status evaluator is configured to evaluate whether a gaze position is within a threshold distance from a selectable object for a duration greater than a threshold duration; and the controller is configured to select the selectable object out of the one or more selectable objects displayed in the image display area in response to a gaze status indicating that the gaze position is within the threshold distance from the selectable object for the duration greater than the threshold duration.

Optionally, the controller is configured to control the rear-view mirror in an anti-glare mode in response to one or more glare conditions being detected, a reflectivity of the rear-view mirror in the anti-glare mode being dimmed.

Optionally, the rear-view mirror has a first side and a second side opposite to the first side, the second side being a light reflective side of the rear-view mirror; the vision-based interactive control apparatus further comprises a first photosensor configured to detect a first light intensity received from the first side and a second photosensor configured to detect a second light intensity received from the second side; and the controller is configured to control the rear-view mirror in the anti-glare mode in response to the second light intensity being greater than the first light intensity by a first intensity value equal to or greater than a threshold intensity value.

Optionally, the gaze status evaluator is configured to evaluate whether a transition from a presence of a gaze position in the rear-view mirror to an absence of the gaze position in the rear-view mirror has occurred in a threshold period of time; and the controller is configured to control the rear-view mirror in the anti-glare mode in response to an evaluation that the transition has occurred, and the second light intensity being greater than the first light intensity by the first intensity value equal to or greater than the threshold intensity value.

Optionally, the gaze status evaluator is configured to evaluate whether a transition from a presence of a gaze position in the rear-view mirror to an absence of the gaze position in the rear-view mirror has occurred in a threshold period of time; the second light intensity being greater than the first light intensity by a second intensity value less than the threshold intensity value at a time the transition has occurred; and the controller comprises an updater configured to update the threshold intensity value with the second intensity value.

Optionally, the controller is configured to control the rear-view mirror in a first anti-glare mode having a first anti-glare parameter in response to the second light intensity being greater than the first light intensity by an intensity value in a first range; the gaze status evaluator is configured to evaluate whether a transition from a presence of a gaze position in the rear-view mirror to an absence of the gaze position in the rear-view mirror occurs in a threshold period of time when the second light intensity is greater than the first light intensity by the intensity value in the first range; and the controller is configured to control the rear-view mirror in a second anti-glare mode having a second anti-glare parameter different from the first anti-glare parameter in response to an evaluation that the transition has occurred when the second light intensity is greater than the first light intensity by the intensity value in the first range.

Optionally, the rear-view mirror is configured to turn off the anti-glare mode in response to the second light intensity being greater than the first light intensity by an intensity value less than the threshold intensity value, or the second light intensity being equal to or less than the first light intensity.

Optionally, the vision-based interactive control apparatus further comprises a gaze position calibrator configured to calibrate the user's gaze position and gaze direction and the plurality of relative positional relationships between the center of a pupil of the user and the plurality of glints.

Optionally, the vision-based interactive control apparatus further comprises a light source intensity adjuster coupled to the image processor and one of the plurality of light sources; wherein the light source intensity adjuster is configured to adjust a light emission intensity of the one of the plurality of light sources in response to a grayscale of one of the plurality of glints corresponding to the one of the plurality of light source being lower than a threshold grayscale.

Optionally, the plurality of light sources are a plurality of infrared light sources.

In another aspect, the present invention provides a rear-view mirror assembly comprising a vision-based interactive control apparatus described herein.

In another aspect, the present invention provides a vehicle comprising a vision-based interactive control apparatus described herein.

In another aspect, the present invention provides a computer-program product comprising a non-transitory tangible computer-readable medium having instructions thereon, the instructions comprising code for causing an image processor to determine a gaze position and gaze direction of a user; and code for causing a controller to control a rear-view mirror based on the user's gaze position and gaze direction.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Currently, some touch-controlled rear-view mirror and voice-controlled rear-view mirror are under development for the next generation vehicles. The touch-controlled rear-view mirror requires a user to touch the screen of the rear-view mirror while the user is driving. This requirement severely affects the driving safety as the user will have to move his hands away from the driving wheel. While the voice-controlled rear-view mirror technology allows the user to use voice as a control means, the voice control is often unreliable, frequently resulting execution of incorrect function by the rear-view mirror. This distracts the driver from paying attention to the road condition, making the driving experience unpleasant and frustrating. Moreover, although some conventional rear-view mirrors are made dimmable, the dimming degree cannot be personalized.

Accordingly, the present disclosure provides, inter alia, a vision-based interactive control apparatus and method of controlling a rear-view mirror for a vehicle that substantially obviate one or more of the problems due to limitations and disadvantages of the related art. In one aspect, the present disclosure provides a vision-based interactive control apparatus. In some embodiments, the vision-based interactive control apparatus includes an image processor configured to determine a gaze position and gaze direction of a user; a rear-view mirror; and a controller coupled to the rear-view mirror and the image processor, and configured to control the rear-view mirror based on the user's gaze position and gaze direction. Optionally, the vision-based interactive control apparatus includes a plurality of image sensors configured to capture a plurality of images of a user's face; a plurality of light sources configured to illuminate the user's eye; an image processor configured to determine the user's gaze position and gaze direction based on a relative positional relationship between a center of a pupil of the user and a plurality of lengths respectively from the plurality of light sources in each of the plurality of images of a user's face; a rear-view mirror comprising an image display panel in an image display area; and a controller coupled to the rear-view mirror and the image processor, and configured to control image display in the rear-view mirror based on the user's gaze position and gaze direction.

Figure 1:
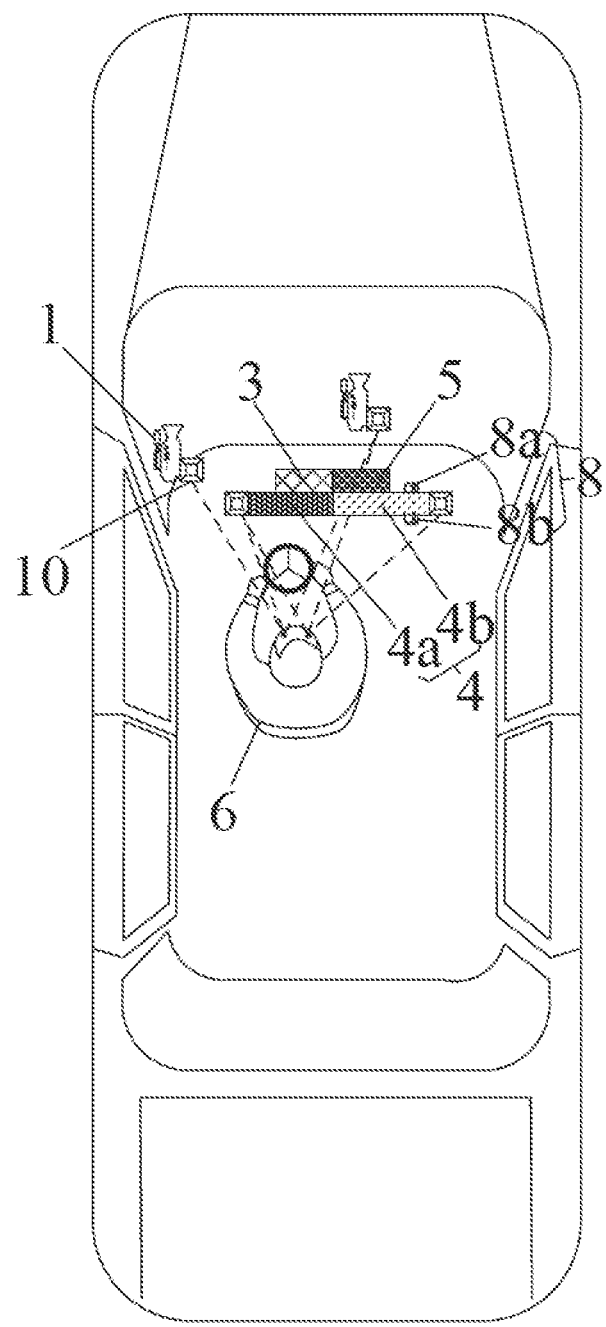
FIG. 1 is a schematic diagram of a vision-based interactive control apparatus adapted for use in a vehicle in some embodiments according to the present disclosure.

FIG. 1 is a schematic diagram of a vision-based interactive control apparatus adapted for use in a vehicle in some embodiments according to the present disclosure. Referring to FIG. 1, the vision-based interactive control apparatus adapted for use in a vehicle in some embodiments includes a plurality of light sources 10 configured to illuminate the user 6's eye, and a plurality of image sensors 1 (e.g., digital cameras or video cameras) configured to capture a plurality of images of a user 6's face. In some examples, the plurality of light sources 10 are a plurality of infrared light sources. e.g., a plurality of near infrared light sources, and correspondingly the plurality of image sensors 1 are a plurality of infrared image sensors, e.g., a plurality of near infrared image sensors. Optionally, the plurality of light sources 10 emit near infrared light having a wavelength in a range of approximately 900 in to approximately 1040 nm, e.g., a wavelength of approximately 950 nm. Optionally, the plurality of image sensors 1 are sensitive to light having a wavelength in a range of approximately 900 nm to approximately 1040 nm, e.g., a wavelength of approximately 950 nm. Optionally, the plurality of image sensors 1 are insensitive to visible light, e.g., light having a wavelength in a range of approximately 400 nm to approximately 700 nm.

The vision-based interactive control apparatus in some embodiments further includes a rear-view mirror 4. The rear-view mirror 4 may be disposed at any appropriate location in the vehicle. In one example, the rear-view mirror 4 is mounted at a location near a roof at the center front of the cabin of the vehicle. In another example, the rear-view mirror 4 is mounted at a dashboard of the vehicle. In another example, the rear-view mirror 4 is mounted on a windshield of the vehicle.

In some embodiments, the rear-view mirror 4 includes an image display panel 4a in an image display area. The image display panel 4a is configured to display various images. For example, the image display panel 4a may be used as an interface for a GPS navigation system, for stream video feeds of images captured be one or more cameras installed outside or inside the vehicle, for various applications such as audio and video applications, and for communication applications such as phone calls, etc. In some embodiments, the rear-view mirror 4 further includes a reflective mirror 4b in a reflective mirror area. The reflective mirror 4b allows the user 6 to view a mirror image of a scene behind the vehicle. Optionally, the image display panel 4a and the reflective mirror 4b are substantially integral with each other, and the image display area and the reflective mirror area are substantially overlapping with each other. In one example, the image display panel 4a may be switched on and off depending on the user 6's needs. When the image display panel 4a is switched on, the user 6 is able to view the image displayed on the image display panel 4a. When the image display panel 4a is switched off, the user 6 is able to view the mirror image of a scene behind the vehicle. Optionally, the image display area and the reflective mirror area are substantially non-overlapping with each other (as shown in FIG. 1).

The plurality of light sources 10 may be disposed at any appropriate locations in the vehicle. In one example, at least one of the plurality of light sources 10 is mounted on a dashboard of the vehicle. In another example, at least one of the plurality of light sources 10 is mounted on a windshield of the vehicle. In another example, at least one of the plurality of light sources 10 is mounted on a roof of the vehicle. In another example, at least one of the plurality of light sources 10 is mounted on a driving wheel of the vehicle. In another example, at least one of the plurality of light sources 10 is mounted on a rear-view mirror of the vehicle. As shown in FIG. 1, in some examples, the plurality of light sources 10 are mounted on the plurality of image sensors 1 and two sides of the rear-view mirror 4.

Referring to FIG. 1, the vision-based interactive control apparatus in some embodiments further includes an image processor 3 coupled to (wired or wirelessly) the plurality of image sensors 1 and a controller 5 coupled to (wired or wirelessly) the rear-view mirror 4 and the image processor 3. The image processor 3 and the controller 5 may be disposed at any appropriate locations in the vehicle. In one example, and as shown in FIG. 1, the image processor 3 and the controller 5 are disposed on the rear-view mirror 4. In another example, the image processor 3, the controller 5, and the rear-view mirror 4 are packaged as a rea-view mirror assembly. In another example, at least one of the image processor 3 and the controller 5 are disposed on or integrated into other components of the vehicle. The image processor 3 is configured to determine the user's gaze position and gaze direction based on a relative positional relationship between a center of a pupil of the user and a plurality of glints (e.g., Purkinje image) respectively from the plurality of light sources in each of the plurality of images of a user's face captured by the plurality of image sensors. The controller 5 is configured to control one or more functions of the rear-view mirror 4, e.g., to control image display in the rear-view mirror 4 based on the user's gaze position and gaze direction.

Figure 2:
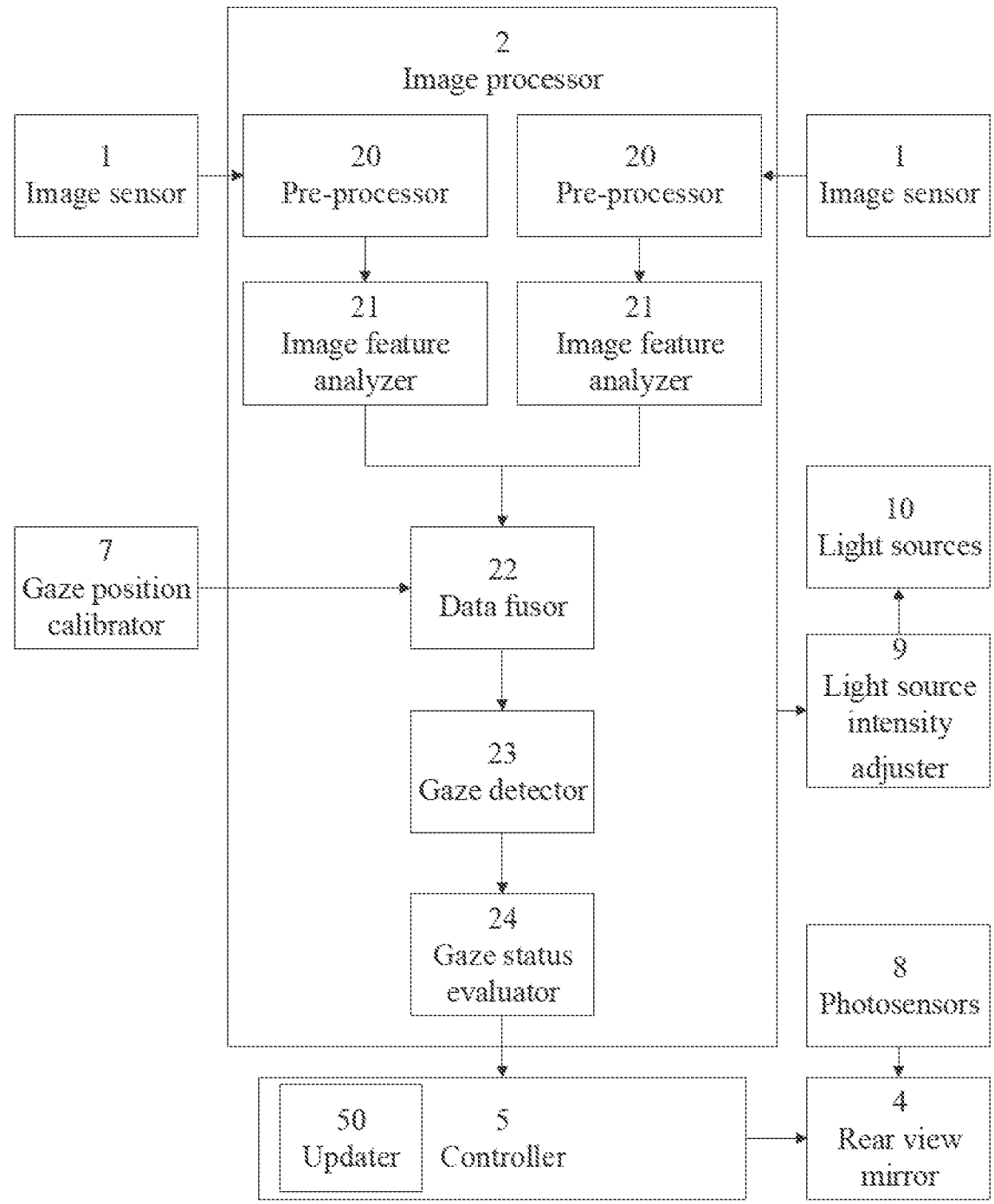
FIG. 2 is a schematic diagram of the structure of a vision-based interactive control apparatus in some embodiments according to the present disclosure.

FIG. 2 is a schematic diagram of the structure of a vision-based interactive control apparatus in some embodiments according to the present disclosure. Referring to FIG. 2, the image processor 2 in some embodiments includes a plurality of image feature analyzers 21. Each of the plurality of image feature analyzers 21 corresponds to one of the plurality of image sensors 1, and is configured to analyze the images captured by one of the plurality of image sensors 1. Optionally, the image processor 2 further includes a plurality of pre-processors 20 configured to pre-processing the plurality of images captured by one of the plurality of image sensors 1. For example, the images may be subject to one or more of smooth filtering and binary processing by the plurality of the pre-processors 20 before they are analyzed by the plurality of image feature analyzers 21.

In some embodiments, each of the plurality of image feature analyzers 21 is configured to identify an eye region containing the user's eye in one of the plurality of images; detect the plurality of glints in the eye region; calculate a center of the pupil of the user; and determine the relative positional relationship between the center of the pupil of the user and the plurality of glints. The plurality of image feature analyzers 21 determine a plurality of relative positional relationships between the center of the pupil of the user and the plurality of glints, respectively from a plurality of eye regions in the plurality of images of the user's face.

Various appropriate algorithms may be used for detecting and recognizing an eye region containing the user's eye in the image captured by the image sensor 1. In some embodiments, each of the plurality of image feature analyzers 21 is configured to select the eye region based on reference eye models. Optionally, the reference eye models are pre-trained reference eye models. Optionally, the pre-trained reference eye models are pre-trained using a machine-learning algorithm. Examples of appropriate algorithms for training the reference eye models include, but are not limited to, an Adaboost algorithm, a support vector machine algorithm (linear or non-linear), and a neural network algorithm.

Figure 3:
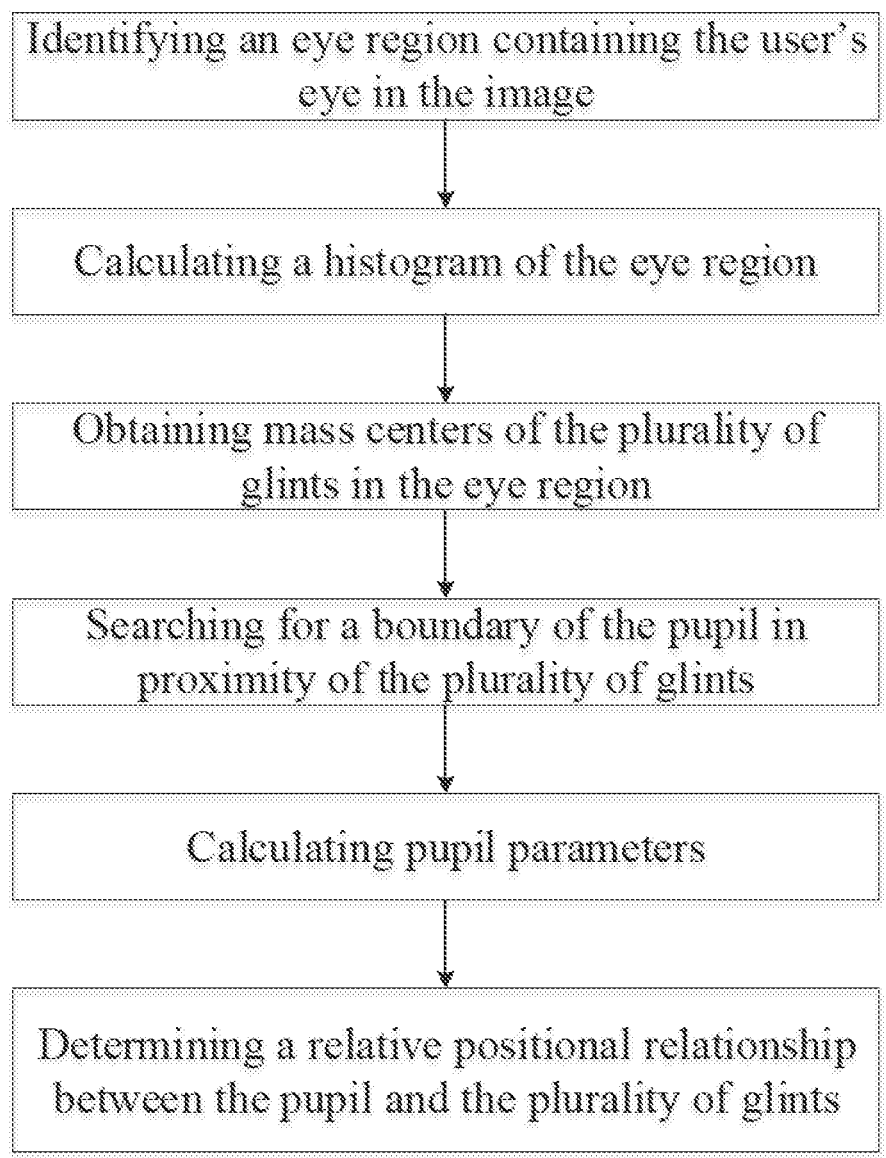
FIG. 3 is an exemplary process performed by an image feature analyzer in some embodiments according to the present disclosure.

FIG. 3 is an exemplary process performed by an image feature analyzer in some embodiments according to the present disclosure. Referring to FIG. 3, the image feature analyzer in some embodiments is configured to identify an eye region containing the user's eye in an image captured by an image sensor. Once the eye region is identified, the image feature analyzer is configured to calculate a histogram of the eye region, derive a glint threshold value based on the relationship between peaks and valleys of the histogram, and obtain mass centers of the plurality of glints in the eye region, e.g., by a binary processing method, thereby detecting the plurality of glints in the eye region. The image feature analyzer is then configured to search for a boundary of the pupil in proximity of the plurality of glints. Once the boundary of the pupil is determined, various pupil parameters, e.g., the center of the pupil, can be derived, e.g., using an ellipse fitting method. A relative positional relationship between the pupil and the plurality of glints (e.g., a relative positional relationship between the center of the pupil and mass centers of the plurality of glints) can be determined based on the pupil parameters and the positions of the plurality of glints.

Figure 4:
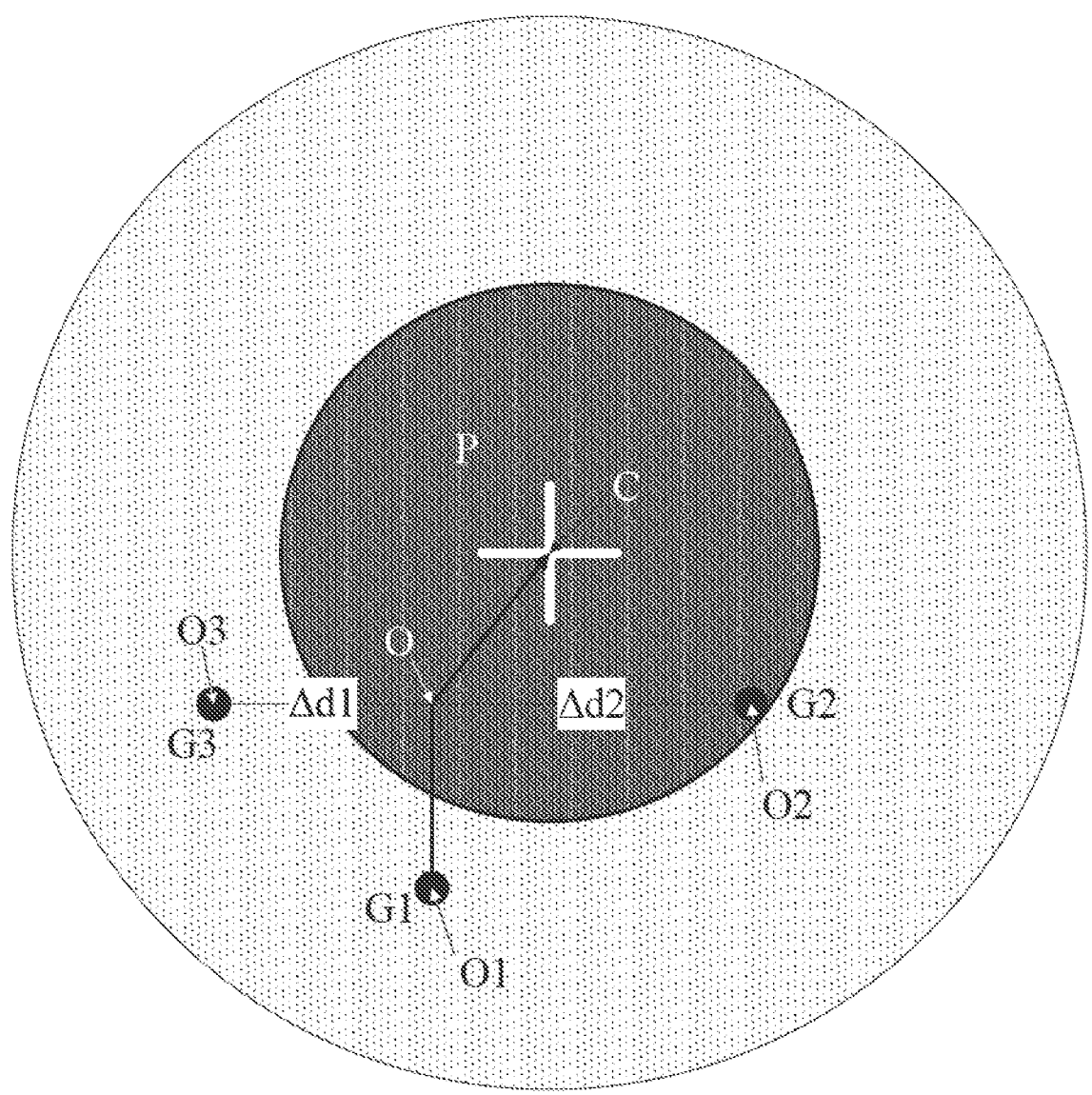
FIG. 4 is a schematic diagram illustrating a relative positional relationship between the center of a pupil and a plurality of glints in some embodiments according to the present disclosure.

FIG. 4 is a schematic diagram illustrating a relative positional relationship between the center of a pupil and a plurality of glints in some embodiments according to the present disclosure. Referring to FIG. 4, the eye region has three glints G1, G2, and G3, the mass centers of which are denoted as O1, O2, and O3, respectively. The center of the pupil P is denoted as C. FIG. 4 also shows a reference point O, which is located in a line connecting O2 and O3. Moreover, a line connecting O1 and O is normal to the line connecting O2 and O3. A distance between O and O3 is denoted as Δd1, and a distance between O and O2 is denoted as Δd2. The relative positional relationship between the center C of the pupil P and the plurality of glints G1, G2, and G3 can be expressed as a relative deviation.

Referring to FIG. 2, the image processor 2 in some embodiments further includes a data fusor 22 configured to fuse relative deviations from a plurality of eye regions in the plurality of images of the user's face (e.g., captured by the plurality of image sensors 1). Optionally, a combined relative deviation Δd is determined according to the following equation:

$$\Delta d = (w1 * \Delta d1) + (w2 \Delta dr) \quad (1);$$

wherein Δd1 is the relative deviation in a first eye region in a first image captured by a first image sensor; Δdr is the relative deviation in a second eye region in a second image captured by a second image sensor; Δdr=(Δd1+Δd2); and w1 and w2 are weight coefficients respectively for Δd1 and Δd2.

Referring to FIG. 2, the image processor 2 in some embodiments further includes a gaze detector 23 configured to calculate the user's gaze position and gaze direction based on the plurality of relative positional relationships between the center of a pupil of the user and the plurality of glints. Optionally, the gaze position is expressed as coordinates on the image display panel or on the rear-view mirror, and the gaze detector 23 is configured to calculate gaze coordinates on the image display panel based on the plurality of relative positional relationships between the center of a pupil of the user and the plurality of glints. In some embodiments, the gaze detector 23 is configured to calculate gaze coordinates based on a plurality of calibration parameters and the plurality of relative positional relationships. The plurality of calibration parameters may be stored on a memory of the image processor 2 and provided to the gaze detector 23 for performing the calculation. Optionally, the vision-based interactive control apparatus further includes a gaze position calibrator 7 configured to calibrate the user's gaze position and gaze direction and the plurality of relative positional relationships between the center of a pupil of the user and the plurality of glints.

Figure 5:
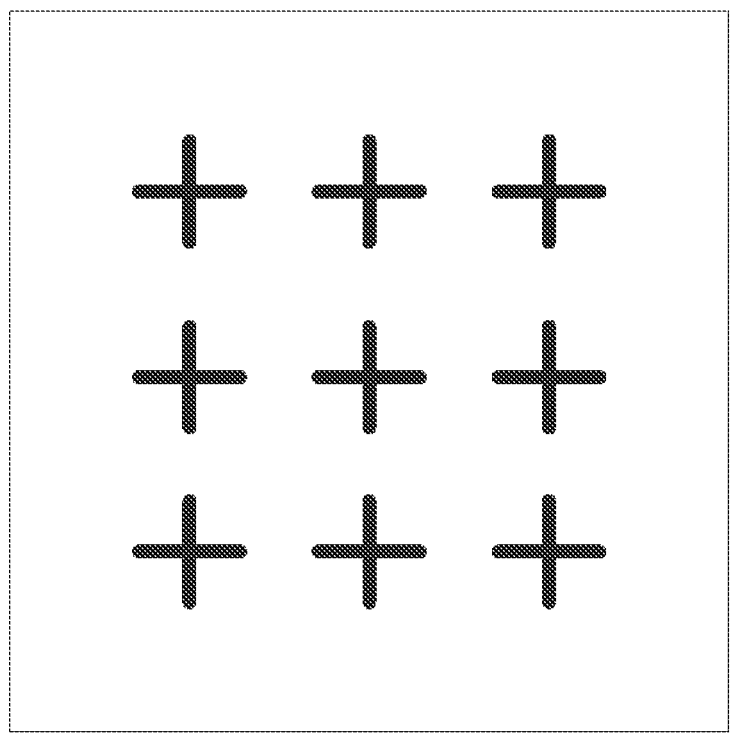
FIG. 5 is a schematic diagram illustrating a calibration image for calibrating user's gaze position and gaze direction and the plurality of relative positional relationships in some embodiments according to the present disclosure.

FIG. 5 is a schematic diagram illustrating a calibration image for calibrating user's gaze position and gaze direction and the plurality of relative positional relationships in some embodiments according to the present disclosure. Referring to FIG. 5, the image includes nine cross-points. During the calibration process, the user is to maintain his head still, and gaze each of the nine cross-points one by one. A relative positional relationship between the center of a pupil of the user and the plurality of glints is calculated each time the user is gazing a different cross-point. A correspondence between gaze positions (e.g., the coordinates on the image display panel) and the plurality of relative positional relationships can be established.

In one example, the correspondence between gaze positions (e.g., the coordinates on the image display panel) and the plurality of relative positional relationships can be expressed according to the following equation:

$$X_s = a1 + a2*dx + a3*dy + a4*dx*dy + a5*dx*dx + a6*dy*dy \quad (2);$$

$$Y_s = b1 + b2*dx + b3*dy + b4*dx*dy + b5*dx*dx + b6*dy*dy \quad (3);$$

wherein Xs and Ys are coordinates in the image display panel, dx and dy are relative deviations of a reference glint, and a1-a6 and b1-b6 are calibration parameters. A total of 18 equations may be obtained from calibration of nine cross points. The calibration parameters a1-a6 and b1-b6 can thus be obtained, e.g., by a least square method. The gaze detector can calculate gaze coordinates based on the calibration parameters and the plurality of relative positional relationships.

Referring to FIG. 2, the image processor 2 in some embodiments further includes a gaze status evaluator 24 configured to evaluate whether the user is looking at the image display area of the rear-view mirror based on the user's gaze position and gaze direction. Based on an evaluation provided by the gaze status evaluator 24, the controller 5 is configured to control the image display in the rear-view mirror in a dimming mode in response to a gaze status indicating that the user is not looking at the image display area, and control the image display in the rear-view mirror in a normal mode in response to a gaze status indicating that the user is looking at the image display area. A brightness level of the image display in the dimming mode is lower than that in the normal mode. In one example, the controller is configured to control light emission intensity of a backlight module of the image display panel thereby controlling the image display in the rear-view mirror in the dimming mode or in the normal mode. In another example, the controller is configured to control a light blocking degree of an electrochromic film attached to the image display panel thereby controlling the image display in the rear-view mirror in the dimming mode or in the normal mode.

When the user is looking at the image display area, the image display panel is controlled to display image in the normal mode, so that the user can view the image display clearly. When the user is not looking at the image display area, the image display panel is controlled to display image in the dimming mode, so that the interference of the image display on the user's attention on the driving can be reduced. By having this design, driving safety can be improved.

Figure 6:
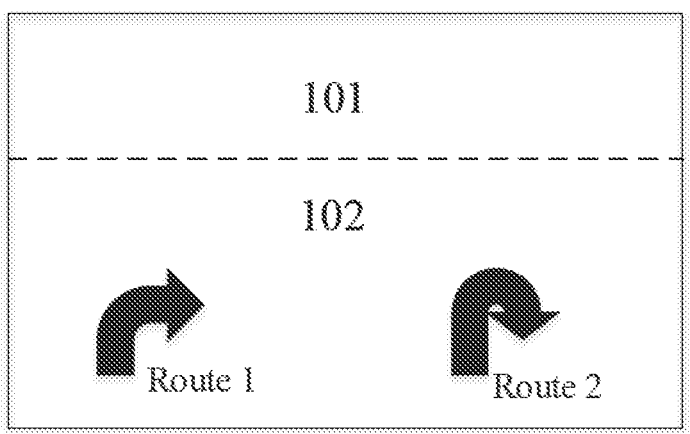
FIG. 6 is a schematic diagram illustrating image display of a plurality of selectable objects in an image display area of the rear-view mirror in some embodiments according to the present disclosure.

In some embodiments, one or more selectable objects are displayed in the image display area of the image display panel. The gaze status evaluator 24 is configured to evaluate whether a gaze position is within a threshold distance from a selectable object for a duration greater than a threshold duration. The controller 5 is configured to select the selectable object out of the one or more selectable objects displayed in the image display area in response to a gaze status indicating that the gaze position is within the threshold distance from the selectable object for the duration greater than the threshold duration. FIG. 6 is a schematic diagram illustrating image display of a plurality of selectable objects in an image display area of the rear-view mirror in some embodiments according to the present disclosure. Referring to FIG. 6, the rear-view mirror has a reflective mirror area 101 and an image display area 102. In FIG. 6, a navigation system displays a plurality of navigation schemes on the interface, including a Route 1 and a Route 2. When the gaze status evaluator 24 provides a gaze status indicating that a user's gaze position is within the threshold distance from the Route 1 icon for a duration longer than a threshold duration, the Route 1 icon will be selected by the controller. The navigation system receives a command that the Route 1 is selected, and displays Route 1 navigation scheme on the image display area 102. The threshold distance and the threshold duration can be determined empirically. Optionally, the threshold distance is zero, e.g., the gaze position at least partially overlaps with the Route 1 icon. In one example, the threshold duration is 5 seconds.

The threshold distance between the gaze position and the selectable object may have any appropriate value. In one example, the threshold distance may have a value on the orders of millimeters or centimeters. In another example, the threshold distance may have a value in a range of approximately 0 millimeter (e.g., the gaze position is on the selectable object) to approximately 0.5 millimeter, approximately 0.5 millimeter to approximately 1 millimeter, approximately 1 millimeter to approximately 2 millimeters, approximately 2 millimeters to approximately 5 millimeters, approximately 5 millimeters to approximately 1 centimeter, approximately 1 centimeter to approximately 2 centimeters, approximately 2 centimeters to approximately 5 centimeters, and so on. Optionally, the threshold distance may have a value less than approximately 5 centimeters, less than approximately 2 centimeters, less than approximately 1 centimeter, less than approximately 5 millimeters, less than approximately 2 millimeters, less than approximately 1 millimeter, less than approximately 0.5 millimeter, and so on. Optionally, the threshold distance may have a value equal to or greater than approximately 0.5 millimeter, equal to or greater than approximately 1 millimeter, equal to or greater than approximately 2 millimeters, equal to or greater than approximately 5 millimeters, equal to or greater than approximately 1 centimeter, equal to or greater than approximately 2 centimeters, equal to or greater than approximately 5 centimeters, and so on. Optionally, the threshold distance may have a value that is approximately 0.5 millimeter, approximately 1 millimeter, approximately 2 millimeters, approximately 5 millimeters, approximately 1 centimeter, approximately 2 centimeters, approximately 5 centimeters, and so on.

The threshold duration may have any appropriate value. In one example, the threshold duration may have a value in a range of approximately 1 second to approximately 2 seconds, approximately 2 seconds to approximately 5 seconds, approximately 5 seconds to approximately 10 seconds, approximately 10 seconds to approximately 15 seconds, and so on. Optionally, the threshold distance and the threshold duration may be pre-determined threshold values. For example, the threshold distance and the threshold duration may be pre-determined threshold values such that the gaze status evaluator can sensitively determine whether the user intends to select the selectable object while any unintentional or accidental gaze on or around the selectable object is ignored.

In conventional vehicular navigation systems, the selection of navigation scheme is performed by either hand touching the selectable object on the image display panel or by voice-based commands. The voice-based interactive control is not a reliable controlling method, often resulting in a selection of an incorrect route. The hand touching control requires the user to move his hands away from the driving wheel, affecting driving safety. Using the present vision-based interactive control apparatus, the image display in the rear-view mirror can be reliably controlled without affecting the driving safety.

In some embodiments, the controller 5 is further configured to control the rear-view mirror in an anti-glare mode in response to one or more glare conditions being detected, a reflectivity of the rear-view mirror in the anti-glare mode being dimmed. In one example, the rear-view mirror includes an image display area having an image display panel and a reflective mirror area having a reflective mirror that allows the user to view a mirror image of a scene behind the vehicle. Optionally, the controller 5 is configured to control the reflective mirror in an anti-glare mode in response to one or more glare conditions being detected. Optionally, the image display panel and the reflective mirror are substantially integral with each other, the image display area and the reflective mirror area are substantially overlapping with each other (e.g., constituting an integral area), and the controller 5 is configured to control the integral area in an anti-glare mode in response to one or more glare conditions being detected.

Figure 7:
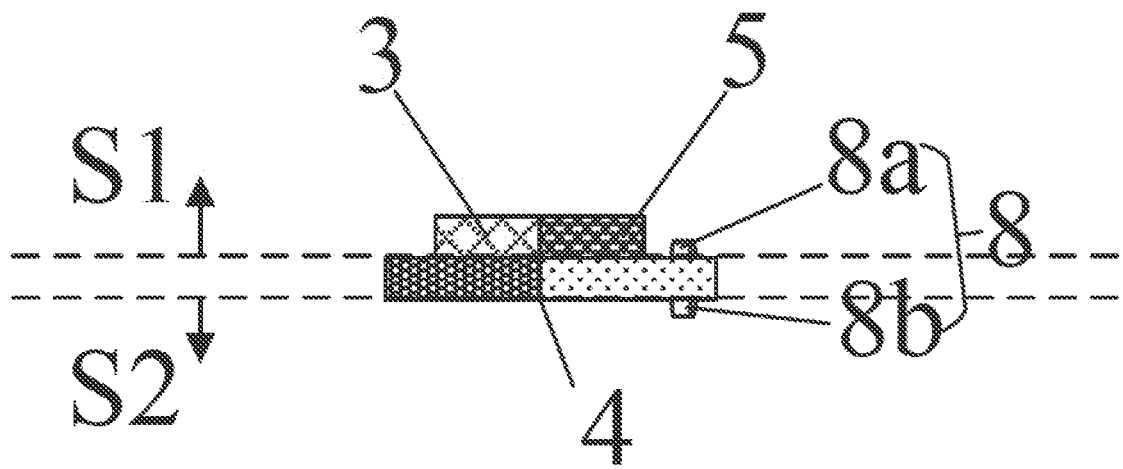
FIG. 7 is a zoom-in view of the rear-view mirror in FIG. 1.

Referring to FIG. 1, the vision-based interactive control apparatus in some embodiments further includes a first photosensor 8a and a second photosensor 8b. FIG. 7 is a zoom-in view of the rear-view mirror in FIG. 1. Referring to FIG. 7, the rear-view mirror 4 has a first side S1 and a second side S2 opposite to the first side S1. The second side S2 is a light reflective side of the rear-view mirror 4, e.g., for providing a reflective mirror image of a scene behind the vehicle. The first photosensor 8a is configured to detect a first light intensity received from the first side S1. The second photosensor 8b is configured to detect a second light intensity received from the second side S2. Optionally, the first photosensor 8a is disposed on the first side S of the rear-view mirror 4 and facing away from the second side so that the light detection unit of the first photosensor 8a receives light substantially from the first side S1. Optionally, the second photosensor 8b is disposed on the second side S2 of the rear-view mirror 4 and facing away from the first side so that the light detection unit of the second photosensor 8b receives light substantially from the second side S2. Optionally, the first photosensor 8a is not attached onto the rear-view mirror 4 as long as it is configured to receives light substantially from the first side S1 and substantially not from the second side S2. Optionally, the second photosensor 8b is not attached onto the rear-view mirror 4 as long as it is configured to receives light substantially from the second side S2 and substantially not from the first side S1. The first photosensor 8a and the second photosensor 8b are coupled to the controller 5 (wired or wirelessly).

In some embodiments, the controller 5 is configured to control the rear-view mirror 4 in the anti-glare mode in response to the second light intensity being greater than the first light intensity by a first intensity value equal to or greater than a threshold intensity value. In a normal driving environment, the first light intensity and the second light intensity have a difference fluctuating in a normal range. For example, the second light intensity may be less than the first light intensity when there is another vehicle moving towards the user in an opposite direction. When there is another vehicle moving towards the user behind the user's vehicle, the light (e.g., a head light) from the vehicle behind the user may cause a glare on the reflective mirror of the rear-view mirror 4. The threshold intensity value can be set to eliminate the glare on the reflective mirror.

Various appropriate methods may be implemented to control the rear-view mirror 4 in the anti-glare mode. In one example, a controllable electrochromic anti-glare mirror is provided as the reflective mirror of the rear-view mirror 4. When one or more glare conditions are detected, the controller 5 is configured to send an electrical signal to an electrochromic layer of the controllable electrochromic anti-glare mirror to increase the light blocking degree of the electrochromic layer. As a result, the controllable electrochromic anti-glare mirror darkens, which reduces the reflectivity of the controllable electrochromic anti-glare mirror, thereby reducing the glare on the mirror. When glare conditions are not detected, the electrical signal is not applied to the electrochromic layer of the controllable electrochromic anti-glare mirror.

Optionally, the electrical signal is independent of the difference between first light intensity and the second light intensity. Optionally, the electrical signal is correlated to the difference between first light intensity and the second light intensity so that the anti-glare degree in the anti-glare mode is correlated to the difference between first light intensity and the second light intensity. In one example, the electrical signal can be determined based on the following equation:

$$s=k* \Delta I \qquad (4);$$

wherein k is a constant, s is the electrical signal, and $\Delta I$ is the difference between first light intensity and the second light intensity. Optionally, the electrical signals is a voltage applied to the electrochromic layer of the controllable electrochromic anti-glare mirror. The constant k may be determined empirically, and can be adjusted until the user's reaction to glare does not occur when a certain electrical signal is applied.

In some embodiments, the one or more glare conditions further include the user's reactions to glare. A normal person typically reacts to glare by closing his eyes, blinking, or moving his gaze away from the glare. When the user reacts to the glare in any of these reactions, a gaze position in the rear-view mirror will be lost in a short period of time. For example, the image processor 2 may fail to detect the user's gaze in a short period of time. Accordingly, in some embodiments, the one or more glare conditions includes an occurrence of a transition from a presence of a gaze position in the rear-view mirror to an absence of the gaze position in the rear-view mirror in a threshold period of time (e.g., in a two-second period). The controller 5 is configured to control the rear-view mirror in the anti-glare mode in response to an evaluation that the transition has occurred.

Optionally, the controller 5 is configured to control the rear-view mirror 4 in the anti-glare mode based on a single one glare condition.

Optionally, the controller 5 is configured to control the rear-view mirror 4 in the anti-glare mode based on occurrence of two or more glare conditions. Optionally, the controller 5 is configured to control the rear-view mirror 4 in the anti-glare mode based on detection of the user's reactions to glare and the second light intensity being greater than the first light intensity by the first intensity value equal to or greater than the threshold intensity value. In one example, the controller 5 is configured to control the rear-view mirror in the anti-glare mode in response to an evaluation that a transition from a presence of a gaze position in the rear-view mirror to an absence of the gaze position in the rear-view mirror has occurred in a threshold period of time has occurred, and the second light intensity being greater than the first light intensity by the first intensity value equal to or greater than the threshold intensity value.

Referring to FIG. 2, the controller 5 in some embodiments includes an updater 50 configured to update the threshold intensity value used for evaluating glare conditions. In some embodiments, the gaze status evaluator 24 is configured to evaluate whether a user's reaction to glare has occurred, e.g., whether a transition from a presence of a gaze position in the rear-view mirror to an absence of the gaze position in the rear-view mirror has occurred in a threshold period of time. When the user's reaction to glare (e.g., eye blinking, eye closing, moving the gaze from the mirror) is detected, while the second light intensity is greater than the first light intensity by a second intensity value that is less than the threshold intensity value at a time the transition has occurred, the updater 50 is configured to update the threshold intensity value with the second intensity value.

By having this design, the vision-based interactive control apparatus can predict occurrence of the user's reaction to glare based on historical data of the user's behavior. The historical data and the threshold intensity values can be stored in a memory, e.g., a transitory memory. In one example, the user's reaction to glare is detected while the second light intensity is greater than the first light intensity by a second intensity value of $\Delta p1$ that is less than the threshold intensity value $\Delta p$ at the time the user's reaction to glare is detected, the updater 50 of the controller 5 updates the threshold intensity value $\Delta p$ to $\Delta p1$. The anti-glare parameter U (e.g., the electrical signal applied to the electrochromic layer of the mirror) is correspondingly adjusted to $U+\Delta u$, under which the anti-glare mode will be turned on next time when the second light intensity is greater than the first light intensity by $\Delta p1$. Later in time, when the second light intensity is greater than the first light intensity by a value in a range of $(\Delta p1-\varepsilon)$ to $(\Delta p1+\varepsilon)$, the anti-glare parameter of $U+\Delta u$ is used, and the gaze status evaluator is configured to detect whether a user's reaction to glare occurs. If one or more user's reactions to glare occur, the anti-glare parameter $U+\Delta u$ is further updated to $(U+\Delta u+\Delta u)$. The process is reiterated until the user's reaction to glare is not detected any more.

Accordingly, the present vision-based interactive control apparatus is further configured to automatically update the anti-glare mode from a first anti-glare mode to a second anti-glare mode. Optionally, the first anti-glare mode and the second anti-glare mode have different anti-glare degrees, e.g., different light block degrees of the electrochromic layer of the mirror. In some embodiments, the controller 5 is configured to control the rear-view mirror in a first anti-glare mode having a first anti-glare parameter (e.g., $U+\Delta u$) in response to the second light intensity being greater than the first light intensity by an intensity value in a first range (e.g., a range of $(\Delta p1-\varepsilon)$ to $(\Delta p1+\varepsilon)$). The gaze status evaluator 24 is configured to evaluate whether a user's reaction to glare occurs when the second light intensity is greater than the first light intensity by an intensity value in the first range. For example, the gaze status evaluator 24 is configured to evaluate whether a transition from a presence of a gaze position in the rear-view mirror to an absence of the gaze position in the rear-view mirror has occurred in a threshold period of time when the second light intensity is greater than the first light intensity by an intensity value in the first range. If one or more user's reactions to glare occur, the controller 5 is configured to control the rear-view mirror in a second anti-glare mode having a second anti-glare parameter (e.g., $U+\Delta u+\Delta u$).

In some embodiments, the rear-view mirror 4 is configured to turn off the anti-glare mode in response to the second light intensity being greater than the first light intensity by an intensity value less than the threshold intensity value, or the second light intensity being equal to or less than the first light intensity.

Figure 8:
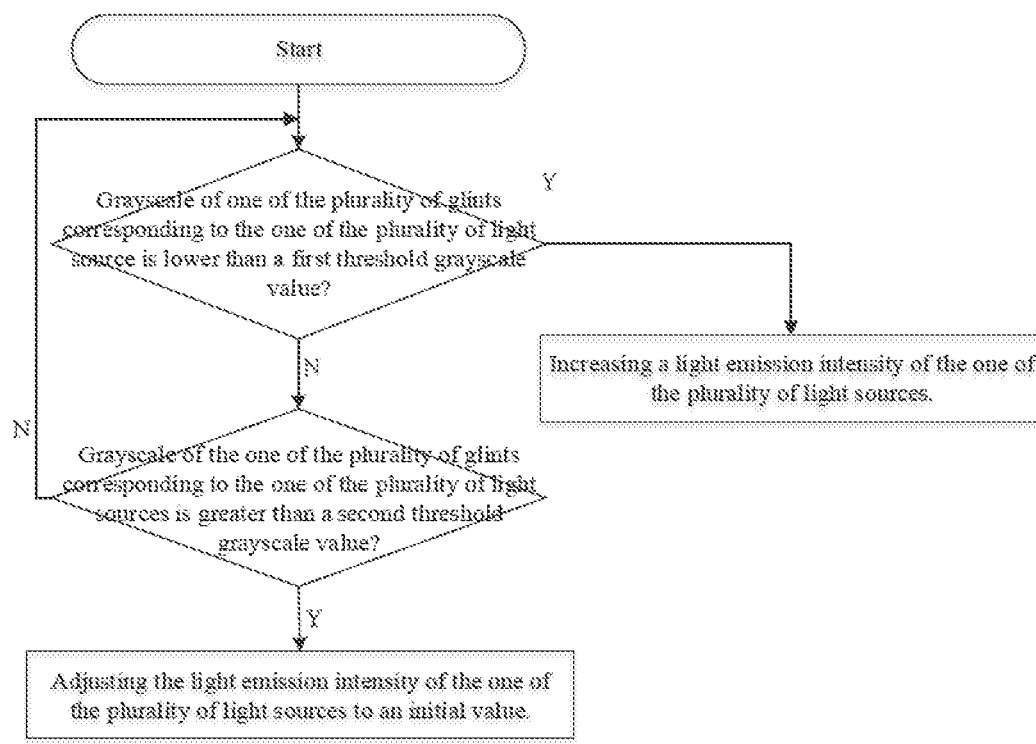
FIG. 8 is an exemplary process performed by a light source intensity adjuster in some embodiments according to the present disclosure.

In some embodiments, and referring to FIG. 2, the vision-based interactive control apparatus further includes a light source intensity adjuster 9 coupled to the image processor 2 and at least one of the plurality of light sources 10. The light source intensity adjuster 9 is configured to adjust a light emission intensity of the one of the plurality of light sources 10 in response to a grayscale of one of the plurality of glints corresponding to the one of the plurality of light source 10 being lower than a threshold grayscale. FIG. 8 is an exemplary process performed by a light source intensity adjuster in some embodiments according to the present disclosure. Referring to FIG. 8, at the start of the process, the image processor 2 evaluates whether a grayscale of one of the plurality of glints corresponding to the one of the plurality of light sources 10 is lower than a first threshold grayscale value. If it is true, the light source intensity adjuster 9 is configured to increase a light emission intensity of the one of the plurality of light sources 10. If it is false, the image processor 2 continues to evaluate whether a grayscale of the one of the plurality of glints corresponding to the one of the plurality of light sources 10 is greater than a second threshold grayscale value. If it is true, the light source intensity adjuster 9 is configured to adjust the light emission intensity of the one of the plurality of light sources 10 to its initial value. If it is false, the process is reiterated.

In another aspect, the present disclosure provides a rear-view mirror assembly having a vision-based interactive control apparatus described herein.

In another aspect, the present disclosure provides a vehicle having a vision-based interactive control apparatus described herein. Optionally, the vision-based interactive control apparatus is a stand-alone apparatus to be coupled to the vehicle. Optionally, one or more components of the present vision-based interactive control apparatus may be integrated into the vehicle.

In another aspect, the present disclosure provides a method of controlling a rear-view mirror for a vehicle. In some embodiments, the method includes determining a gaze position and a gaze direction of a user; and controlling the rear-view mirror based on the user's gaze position and gaze direction. Optionally, the method includes illuminating the user's eye using a plurality of light sources; capturing a plurality of images of a user's face; determining the user's gaze position and gaze direction based on a relative positional relationship between a center of a pupil of the user and a plurality of glints respectively from the plurality of light sources in each of the plurality of images of a user's face; and controlling image display in an image display area of the rear-view mirror based on the user's gaze position and gaze direction.

Figure 9:
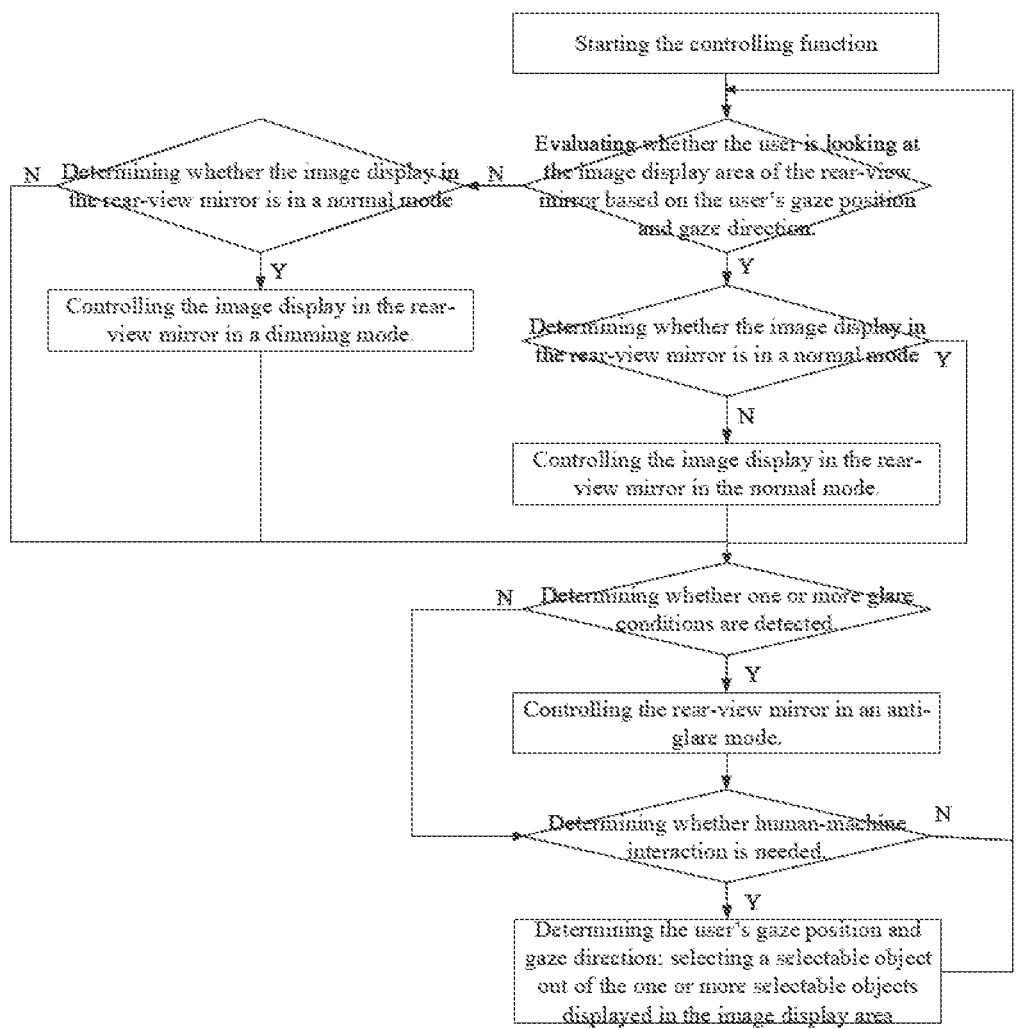
FIG. 9 is a flow chart illustrating a method of controlling a rear-view mirror for a vehicle in some embodiments according to the present disclosure.

FIG. 9 is a flow chart illustrating a method of controlling a rear-view mirror for a vehicle in some embodiments according to the present disclosure. Referring to FIG. 9, the method in some embodiments includes first evaluating whether the user is looking at the image display area of the rear-view mirror based on the user's gaze position and gaze direction. If it is evaluated that the user is not looking at the image display area, the method further includes determining whether the image display in the rear-view mirror is in a normal mode. If the image display in the rear-view mirror is in the normal mode, the method further includes controlling the image display in the rear-view mirror in a dimming mode.

If it is evaluated that the user is looking at the image display area, the method further includes determining whether the image display in the rear-view mirror is in the normal mode. If the image display in the rear-view mirror is not in the normal mode, the method further includes controlling the image display in the rear-view mirror in the normal mode.

Next, the method in some embodiments further includes determining whether one or more glare conditions are detected. This step may be performed whether or not the user is looking at the image display area of the rear-view mirror. If the one or more glare conditions are detected, the method further includes controlling the rear-view mirror in an anti-glare mode.

Next, the method in some embodiments further includes determining whether human-machine interaction is needed. This step may be performed whether or not one or more glare conditions are detected. If it is determined that the human-machine interaction is needed, the method in some embodiments further includes determining the user's gaze position and gaze direction; and selecting a selectable object out of the one or more selectable objects displayed in the image display area.

In some embodiments, the method includes identifying an eye region containing the user's eye in one of the plurality of images; detecting the plurality of glints in the eye region; calculating a center of the pupil of the user; and determining the relative positional relationship between the center of the pupil of the user and the plurality of glints. Optionally, a plurality of relative positional relationships between the center of the pupil of the user and the plurality of glints, respectively from a plurality of eye regions in the plurality of images of the user's face, can be determined. Optionally, the step of identifying an eye region containing the user's eye in one of the plurality of images includes identifying the eye region based on reference eye models, e.g., pre-trained reference eye models using a machine-learning algorithm. Optionally, the method further includes training a plurality of reference eye models using a machine-learning algorithm. Examples of appropriate algorithms for training the reference eye models include, but are not limited to, an Adaboost algorithm, a support vector machine algorithm (linear or non-linear), and a neural network algorithm.

Optionally, the step of detecting the plurality of glints in the eye region includes calculating a histogram of the eye region, deriving a glint threshold value based on the relationship between peaks and valleys of the histogram, and obtaining mass centers of the plurality of glints in the eye region. e.g., by a binary processing method, thereby detecting the plurality of glints in the eye region. Optionally, the step of calculating a center of the pupil of the user includes searching for a boundary of the pupil in proximity of the plurality of glints, and determining various pupil parameters, e.g., the center of the pupil, based on the boundary of the pupil. Optionally, the step of determining pupil parameters is performed by an ellipse fitting method. Once the pupil parameters and the positions of the plurality of glints are calculated, the method further includes determining a relative positional relationship between the pupil and the plurality of glints, e.g., a relative positional relationship between the center of the pupil and mass centers of the plurality of glints.

In some embodiments, the step of determining the user's gaze position and gaze direction are performed based on the plurality of relative positional relationships between the center of a pupil of the user and the plurality of glints. Optionally, the step of determining the user's gaze position and gaze direction includes calculating gaze coordinates on the image display panel (or on the rear-view mirror) based on the plurality of relative positional relationships between the center of a pupil of the user and the plurality of glints. Optionally, the step of calculating gaze coordinates includes calculating gaze coordinates based on a plurality of calibration parameters and the plurality of relative positional relationships.

In some embodiments, the method further includes calibrating the user's gaze position and gaze direction and the plurality of relative positional relationships between the center of a pupil of the user and the plurality of glints. Optionally, the step of calibrating the user's gaze position and gaze direction and the plurality of relative positional relationships between the center of a pupil of the user and the plurality of glints includes establishing a correspondence between gaze positions (e.g., the coordinates on the image display panel) and the plurality of relative positional relationships using a calibration image. Optionally, the step of calibrating the user's gaze position and gaze direction and the plurality of relative positional relationships between the center of a pupil of the user and the plurality of glints further includes deriving calibration parameters based on the correspondence between gaze positions (e.g., the coordinates on the image display panel) and the plurality of relative positional relationships established using the calibration image.

In some embodiments, the method further includes evaluating whether the user is looking at the image display area of the rear-view mirror based on the user's gaze position and gaze direction. Optionally, the method further includes controlling the image display in the rear-view mirror in a dimming mode in response to an evaluation indicating that the user is not looking at the image display area, and controlling the image display in the rear-view mirror in a normal mode in response to an evaluation indicating that the user is looking at the image display area. A brightness level of the image display in the dimming mode is lower than that in the normal mode. Optionally, the step of controlling image display in the rear-view mirror includes controlling light emission intensity of a backlight module of the image display panel. Optionally, the step of controlling image display in the rear-view mirror includes controlling a light blocking degree of an electrochromic film attached to the image display panel.

In some embodiments, one or more selectable objects are displayed in the image display area of the rear-view mirror. Optionally, the method further includes evaluating whether a gaze position is within a threshold distance from a selectable object for a duration greater than a threshold duration; and selecting the selectable object out of the one or more selectable objects displayed in the image display area in response to a gaze status indicating that the gaze position is within the threshold distance from the selectable object for the duration greater than the threshold duration. Optionally, the method further includes determining the threshold distance and the threshold duration empirically.

In some embodiments, the method further includes controlling the rear-view mirror in an anti-glare mode in response to one or more glare conditions being detected, a reflectivity of the rear-view mirror in the anti-glare mode being dimmed. In one example, the rear-view mirror includes an image display area having an image display panel and a reflective mirror area having a reflective mirror that allows the user to view a mirror image of a scene behind the vehicle. Optionally, the step of controlling the rear-view mirror in an anti-glare mode includes controlling the reflective mirror in an anti-glare mode in response to one or more glare conditions being detected. Optionally, the image display panel and the reflective mirror are substantially integral with each other, the image display area and the reflective mirror area are substantially overlapping with each other (e.g., constituting an integral area), and the method includes controlling the integral area in an anti-glare mode in response to one or more glare conditions being detected.

In some embodiments, the rear-view mirror has a first side and a second side opposite to the first side, the second side being a light reflective side of the rear-view mirror. Optionally, the method further includes detecting a first light intensity received from the first side and detecting a second light intensity received from the second side; and controlling the rear-view mirror in the anti-glare mode in response to the second light intensity being greater than the first light intensity by a first intensity value equal to or greater than a threshold intensity value. Optionally, a controllable electrochromic anti-glare mirror is provided as the reflective mirror of the rear-view mirror. Optionally, the step of controlling the rear-view mirror in the anti-glare mode includes sending an electrical signal to the electrochromic layer of the controllable electrochromic anti-glare mirror to increase the light blocking degree of the electrochromic layer when one or more glare conditions are detected. Optionally, when glare conditions are not detected, the electrical signal is not applied to the electrochromic layer of the controllable electrochromic anti-glare mirror. Optionally, the electrical signal is independent of the difference between first light intensity and the second light intensity. Optionally, the electrical signal is correlated to the difference between first light intensity and the second light intensity so that the anti-glare degree in the anti-glare mode is correlated to the difference between first light intensity and the second light intensity. Optionally, the electrical signal can be determined based on the equation (4):

$$s = k * \Delta I \qquad (4);$$

wherein k is a constant, s is the electrical signal, and ΔI is the difference between first light intensity and the second light intensity. Optionally, the electrical signals is a voltage applied to the electrochromic layer of the controllable electrochromic anti-glare mirror. The constant k may be determined empirically, and can be adjusted until the user's reaction to glare does not occur when a certain electrical signal is applied.

In some embodiments, the method includes detecting the user's reaction to glare; and controlling the rear-view mirror in the anti-glare mode in response to detection of the user's reaction to glare (e.g., eye blinking, eye closing, moving gaze away from the glare). Optionally, the step of detecting the user's reaction to glare includes evaluating whether a transition from a presence of a gaze position in the rear-view mirror to an absence of the gaze position in the rear-view mirror has occurred in a threshold period of time. Optionally, the step of controlling the rear-view mirror in the anti-glare mode includes controlling the rear-view mirror in the anti-glare mode in response to an evaluation that the transition has occurred.

In some embodiments, the step of controlling the rear-view mirror in the anti-glare mode is performed based on occurrence of two or more glare conditions. Optionally, the method includes detecting a first light intensity received from the first side and detecting a second light intensity received from the second side; evaluating whether a transition from a presence of a gaze position in the rear-view mirror to an absence of the gaze position in the rear-view mirror has occurred in a threshold period of time; and controlling the rear-view mirror in the anti-glare mode in response to an evaluation that the transition has occurred, and the second light intensity being greater than the first light intensity by the first intensity value equal to or greater than the threshold intensity value.

In some embodiments, the method further includes updating the threshold intensity value. Optionally, the method includes evaluating whether a user's reaction to glare has occurred. When the user's reaction to glare (e.g., eye blinking, eye closing, moving the gaze from the mirror) is detected, while the second light intensity is greater than the first light intensity by a second intensity value that is less than the threshold intensity value at a time the transition has occurred, the method further includes updating the threshold intensity value with the second intensity value. Optionally, the method includes evaluating whether a transition from a presence of a gaze position in the rear-view mirror to an absence of the gaze position in the rear-view mirror has occurred in a threshold period of time; and when the second light intensity being greater than the first light intensity by a second intensity value less than the threshold intensity value at a time the transition has occurred, the method further includes updating the threshold intensity value with the second intensity value.

In some embodiments, the method further includes automatically update the anti-glare mode from a first anti-glare mode to a second anti-glare mode. Optionally, the first anti-glare mode and the second anti-glare mode have different anti-glare degrees, e.g., different light block degrees of the electrochromic layer of the mirror. Optionally, the method includes controlling the rear-view mirror in a first anti-glare mode having a first anti-glare parameter (e.g., $U+\Delta u$) in response to the second light intensity being greater than the first light intensity by an intensity value in a first range (e.g., a range of $(\Delta p1-\varepsilon)$ to $(\Delta p1+\varepsilon)$); and evaluating whether a user's reaction to glare occurs when the second light intensity is greater than the first light intensity by an intensity value in the first range. Optionally, the step of evaluating whether a user's reaction to glare occurs includes evaluating whether a transition from a presence of a gaze position in the rear-view mirror to an absence of the gaze position in the rear-view mirror has occurred in a threshold period of time when the second light intensity is greater than the first light intensity by an intensity value in the first range. Optionally, the method further includes controlling the rear-view mirror in a second anti-glare mode having a second anti-glare parameter (e.g., $U+\Delta u+\Delta u$) when one or more user's reactions to glare occur.

In some embodiments, the method further includes turning off the anti-glare mode in response to the second light intensity being greater than the first light intensity by an intensity value less than the threshold intensity value, or the second light intensity being equal to or less than the first light intensity.

In some embodiments, the method further includes adjusting alight emission intensity of the one of the plurality of light sources in response to a grayscale of one of the plurality of glints corresponding to the one of the plurality of light source being lower than a threshold grayscale. Optionally, the method includes evaluating whether a grayscale of one of the plurality of glints corresponding to the one of the plurality of light sources is lower than a first threshold grayscale value; increasing a light emission intensity of the one of the plurality of light sources when the grayscale of the one of the plurality of glints corresponding to the one of the plurality of light sources is lower than a first threshold grayscale value. Optionally, the method further includes evaluating whether a grayscale of the one of the plurality of glints corresponding to the one of the plurality of light sources is greater than a second threshold grayscale value; and decreasing the light emission intensity of the one of the plurality of light sources when the grayscale of the one of the plurality of glints corresponding to the one of the plurality of light sources is greater than the second threshold grayscale value. Optionally, the step of decreasing the light emission intensity of the one of the plurality of light sources includes adjusting the light emission intensity of the one of the plurality of light sources to its initial value.

In another aspect, the present disclosure provides a computer-program product including a non-transitory tangible computer-readable medium having instructions thereon. In some embodiments, the instructions include code for causing an image processor to determine a gaze position and gaze direction of a user; and code for causing a controller to control a rear-view mirror based on the user's gaze position and gaze direction. Optionally, the instructions include code for causing an image processor coupled to a plurality of image sensors to determine a user's gaze position and gaze direction based on a relative positional relationship between a center of a pupil of the user and a plurality of glints respectively from a plurality of light sources in each of a plurality of images of a user's face; and code for causing a controller coupled to a rear-view mirror and the image processor to control image display in the rear-view mirror based on the user's gaze position and gaze direction.

In some embodiments, the image processor includes a plurality of image feature analyzers corresponding to the plurality of image sensors. Optionally, the instructions further include code for causing each of the plurality of image feature analyzers to identify an eye region containing the user's eye in one of the plurality of images; detect the plurality of glints in the eye region; calculate a center of the pupil of the user; and determine the relative positional relationship between the center of the pupil of the user and the plurality of glints. The plurality of image feature analyzers determine a plurality of relative positional relationships between the center of the pupil of the user and the plurality of glints, respectively from a plurality of eye regions in the plurality of images of the user's face.

In some embodiments, the image processor includes a gaze detector. Optionally, the instructions further include code for causing the gaze detector to calculate the user's gaze position and gaze direction based on the plurality of relative positional relationships between the center of a pupil of the user and the plurality of glints.

In some embodiments, the image processor further includes a gaze status evaluator. Optionally, the instructions further include code for causing the gaze status evaluator to evaluate whether the user is looking at the image display area of the rear-view mirror based on the user's gaze position and gaze direction.

Optionally, the instructions further include code for causing the controller to control the image display in the rear-view mirror in a dimming mode in response to a gaze status indicating that the user is not looking at the image display area, and control the image display in the rear-view mirror in a normal mode in response to a gaze status indicating that the user is looking at the image display area. A brightness level of the image display in the dinning mode is lower than that in the normal mode.

In some embodiments, one or more selectable objects are displayed in the image display area of the image display panel. Optionally, the instructions further include code for causing the gaze status evaluator to evaluate whether a gaze position is within a threshold distance from a selectable object for a duration greater than a threshold duration; and code for causing the controller to select the selectable object out of the one or more selectable objects displayed in the image display area in response to a gaze status indicating that the gaze position is within the threshold distance from the selectable object for the duration greater than the threshold duration.

Optionally, the instructions further include code for causing the controller to control the rear-view mirror in an anti-glare mode in response to one or more glare conditions being detected, a reflectivity of the rear-view mirror in the anti-glare mode being dimmed.

In some embodiments, the rear-view mirror has a first side and a second side opposite to the first side, the second side being a light reflective side of the rear-view mirror; the vision-based interactive control apparatus further includes a first photosensor configured to detect a first light intensity received from the first side and a second photosensor configured to detect a second light intensity received from the second side. Optionally, the instructions further include code for causing the controller to control the rear-view mirror in the anti-glare mode in response to the second light intensity being greater than the first light intensity by a first intensity value equal to or greater than a threshold intensity value.

Optionally, the instructions further include code for causing the gaze status evaluator to evaluate whether a transition from a presence of a gaze position in the rear-view mirror to an absence of the gaze position in the rear-view mirror has occurred in a threshold period of time; and code for causing the controller to control the rear-view mirror in the anti-glare mode in response to an evaluation that the transition has occurred, and the second light intensity being greater than the first light intensity by the first intensity value equal to or greater than the threshold intensity value.

In some embodiments, the controller includes an updater. Optionally, the instructions further include code for causing the gaze status evaluator to evaluate whether a transition from a presence of a gaze position in the rear-view mirror to an absence of the gaze position in the rear-view mirror has occurred in a threshold period of time. Optionally, the second light intensity being greater than the first light intensity by a second intensity value less than the threshold intensity value at a time the transition has occurred; and the instructions further include code for causing the updater to update the threshold intensity value with the second intensity value.

Optionally, the instructions further include code for causing the rear-view mirror to turn off the anti-glare mode in response to the second light intensity being greater than the first light intensity by an intensity value less than the threshold intensity value, or the second light intensity being equal to or less than the first light intensity.

In some embodiments, the image processor further includes a gaze position calibrator. Optionally, the instructions further include code for causing the gaze position calibrator to calibrate the user's gaze position and gaze direction and the plurality of relative positional relationships between the center of a pupil of the user and the plurality of glints.

Optionally, the instructions further include code for causing a light source intensity adjuster to adjust a light emission intensity of the one of the plurality of light sources in response to a grayscale of one of the plurality of glints corresponding to the one of the plurality of light source being lower than a threshold grayscale. The light source intensity adjuster is coupled to the image processor and one of the plurality of light sources.

In some embodiments, the instructions are stored in one or more memory. Optionally, the one or more memory store computer-executable instructions for controlling one or more processors to perform one or more steps of the method of controlling the rear-view mirror described herein. Various appropriate memory may be used in the present vision-based interactive control apparatus. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory. Various appropriate processors may be used in the present vision-based interactive control apparatus. Examples of appropriate processors include, but are not limited to, a general-purpose processor, a central processing unit (CPU), a microprocessor, a digital signal processor (DSP), a controller, a microcontroller, a state machine, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of controlling a rear-view mirror for a vehicle, the rear-view mirror having a first side and a second side opposite to the first side, the second side being a light reflective side of the rear-view mirror;

the method comprises:
determining a gaze position and a gaze direction of a user;
controlling the rear-view mirror based on the user's gaze position and gaze direction detecting a first light intensity received from the first side and detecting a second light intensity received from the second side;

evaluating whether a transition from a presence of a gaze position in the rear-view mirror to an absence of the gaze position in the rear-view mirror has occurred in a threshold period of time; and controlling the rear-view mirror in an anti-glare mode in response to a difference between the first light intensity and the second light intensity being equal to or greater than a threshold value, and an evaluation that the transition has occurred.

2. The method of claim 1, further comprising:

illuminating the user's eye using a plurality of light sources;

capturing a plurality of images of the user's face;

identifying an eye region containing the user's eye in one of the plurality of images;

detecting the plurality of glints in the eye region;

calculating a center of a pupil of the user; and determining a relative positional relationship between the center of the pupil of the user and the plurality of glints respectively from the plurality of light sources in each of the plurality of images of the user's face;

thereby determining a plurality of relative positional relationships between the center of the pupil of the user and the plurality of glints, respectively from a plurality of eye regions in the plurality of images of the user's face.

3. The method of claim 2, further comprising adjusting a light emission intensity of the one of the plurality of light sources in response to a grayscale of one of the plurality of glints corresponding to the one of the plurality of light source being lower than a threshold grayscale.

4. The method of claim 2, wherein determining the user's gaze position and gaze direction are performed based on the plurality of relative positional relationships between the center of a pupil of the user and the plurality of glints.

5. The method of claim 4, further comprising calibrating the user's gaze position and gaze direction and the plurality of relative positional relationships between the center of a pupil of the user and the plurality of glints.

6. The method of claim 3, wherein controlling the rear-view mirror based on the user's gaze position and gaze direction comprises controlling image display in an image display area of the rear-view mirror based on the user's gaze position and gaze direction; and the method further comprises evaluating whether the user is looking at the image display area of the rear-view mirror based on the user's gaze position and gaze direction.

7. The method of claim 6, wherein controlling image display in the image display area of the rear-view mirror comprises controlling the image display in the image display area of the rear-view mirror in a dimming mode in response to an evaluation indicating that the user is not looking at the image display area, and controlling the image display in the image display area of the rear-view mirror in a normal mode in response to an evaluation indicating that the user is looking at the image display area; and a brightness level of the image display in the dimming mode is lower than that in the normal mode.

8. The method of claim 6, wherein one or more selectable objects are displayed in the image display area of the rear-view mirror;

the method further comprises evaluating whether a gaze position is within a threshold distance from a selectable object for a duration greater than a threshold duration; and selecting the selectable object out of the one or more selectable objects displayed in the image display area in response to a gaze status indicating that the gaze position is within the threshold distance from the selectable object for the duration greater than the threshold duration.

9. The method of claim 6, further comprising controlling the rear-view mirror in an anti-glare mode in response to one or more glare conditions being detected, a reflectivity of the rear-view mirror in the anti-glare mode being dimmed.

10. The method of claim 1, wherein a difference between the first light intensity and the second light intensity is a detected value less than the threshold value at a time the transition has occurred; and the method further comprising updating the threshold value with the detected value.

11. The method of claim 1, further comprising turning off the anti-glare mode in response to a difference between the first light intensity and the second light intensity being smaller than the threshold value.

12. A vision-based interactive control apparatus, comprising:

an image processor configured to determine a gaze position and gaze direction of a user;

a rear-view mirror, the rear-view mirror having a first side and a second side opposite to the first side, the second side being a light reflective side of the rear-view mirror;

a first photosensor configured to detect a first light intensity received from the first side and a second photosensor configured to detect a second light intensity received from the second side; and a controller coupled to the rear-view mirror and the image processor;

wherein the image processor is configured to evaluate whether a transition from a presence of a gaze position in the rear-view mirror to an absence of the gaze position in the rear- view mirror has occurred in a threshold period of time; and the controller is configured to control the rear-view mirror based on the user's gaze position and gaze direction, and control the rear-view mirror in an anti-glare mode in response to the second light intensity being greater than the first light intensity by a first intensity value equal to or greater than a threshold intensity value, and an evaluation that the transition has occurred.

13. The vision-based interactive control apparatus of claim 12, further comprising:

a plurality of image sensors configured to capture a plurality of images of a user's face; and a plurality of light sources configured to illuminate the user's eye;

wherein the image processor is coupled to the plurality of image sensors and configured to determine the user's gaze position and gaze direction based on a relative positional relationship between a center of a pupil of the user and a plurality of glints respectively from the plurality of light sources in each of the plurality of images of the user's face.

14. The vision-based interactive control apparatus of claim 13, wherein the image processor comprises a plurality of image feature analyzers corresponding to the plurality of image sensors, each of the plurality of image feature analyzers is configured to identify an eye region containing the user's eye in one of the plurality of images;

detect the plurality of glints in the eye region;

calculate a center of the pupil of the user; and determine the relative positional relationship between the center of the pupil of the user and the plurality of glints;

wherein the plurality of image feature analyzers determine a plurality of relative positional relationships between the center of the pupil of the user and the plurality of glints, respectively from a plurality of eye regions in the plurality of images of the user's face.

15. The vision-based interactive control apparatus of claim 14, wherein the rear-view mirror comprises an image display panel in an image display area;

the controller is configured to control image display in the rear-view mirror based on the user's gaze position and gaze direction; and the image processor further comprises a gaze detector configured to calculate the user's gaze position and gaze direction based on the plurality of relative positional relationships between the center of a pupil of the user and the plurality of glints.

16. The vision-based interactive control apparatus of claim 15, wherein the image processor further comprises a gaze status evaluator configured to evaluate whether the user is looking at the image display area of the rear-view mirror based on the user's gaze position and gaze direction.

17. A rear-view mirror assembly, comprising the vision-based interactive control apparatus of claim 12.

18. A vehicle, comprising the vision-based interactive control apparatus of claim 12.

19. A method of controlling a rear-view mirror for a vehicle, the rear-view mirror having a first side and a second side opposite to the first side, the second side being a light reflective side of the rear-view mirror;

the method comprises:

determining a gaze position and a gaze direction of a user; controlling the rear-view mirror based on the user's gaze position and gaze direction detecting a first light intensity received from the first side and detecting a second light intensity received from the second side;

controlling the rear-view mirror in an anti-glare mode in response to a difference between the first light intensity and the second light intensity being equal to or greater than a threshold value;

controlling the rear-view mirror in a first anti-glare mode having a first anti-glare parameter in response to the second light intensity being greater than the first light intensity by an intensity value in a first range;

evaluating whether a transition from a presence of a gaze position in the rear-view mirror to an absence of the gaze position in the rear-view mirror occurs in a threshold period of time when the second light intensity is greater than the first light intensity by the intensity value in the first range; and controlling the rear-view mirror in a second anti-glare mode having a second anti- glare parameter different from the first anti-glare parameter in response to an evaluation that the transition has occurred when the second light intensity is greater than the first light intensity by the intensity value in the first range.

* * * * *